United States Patent [19]

Rilett

[11] Patent Number: 4,760,865
[45] Date of Patent: Aug. 2, 1988

[54] CONTAINER VALVE

[76] Inventor: John W. Rilett, Hilltop House, Old Quarry, Bilbury, Gloucestershire GL7 5ND, United Kingdom

[21] Appl. No.: 51,744
[22] PCT Filed: Sep. 11, 1986
[86] PCT No.: PCT/GB86/00539
§ 371 Date: Apr. 21, 1987
§ 102(e) Date: Apr. 21, 1987
[87] PCT Pub. No.: WO87/01785
PCT Pub. Date: Mar. 26, 1987

[30] Foreign Application Priority Data

Sep. 11, 1985 [GB] United Kingdom ............... 8522480

[51] Int. Cl.$^4$ ............................................. F16K 24/00
[52] U.S. Cl. ........................................ 137/588; 141/18; 220/86 R
[58] Field of Search ............... 137/587, 588, 508; 220/86 R, 86 NR; 141/2, 18, 98

[56] References Cited

U.S. PATENT DOCUMENTS

| 3,092,153 | 6/1963 | Stayke | 137/588 X |
| 3,211,175 | 10/1965 | Replogle | 141/18 X |
| 3,221,782 | 12/1965 | Zellweger et al. | 137/588 X |
| 3,324,873 | 6/1967 | Trombatore et al. | 137/588 X |
| 3,398,551 | 8/1968 | Yannascoli | 137/508 X |
| 3,432,080 | 3/1969 | Venus, Jr. | 137/588 X |
| 3,450,155 | 6/1969 | Froehner et al. | 137/508 |
| 3,537,622 | 11/1970 | Venus, Jr. et al. | 137/588 X |
| 3,589,397 | 6/1971 | Wagner | 137/614.2 |
| 3,640,320 | 2/1972 | Elkuch | 137/588 X |
| 3,834,412 | 9/1974 | Fannin | 137/588 X |

FOREIGN PATENT DOCUMENTS 2367238 10/1976 France .
2111646 7/1983 United Kingdom .

Primary Examiner—John Rivell
Attorney, Agent, or Firm—Wood, Dalton, Phillips, Mason & Rowe

[57] ABSTRACT

A fluid valve (3) for incorporation in a container (1) for storing a fluid under pressure and arranged for charging the container therethrough with, and dispensing therethrough from the container, a pressurized fluid, has a chamber (4) having at one end an inlet (15) and at the other end an outlet (9) for the fluid; a valve piston (5) sealingly guided and movable within the chamber (4); and a valve member (10) which is also movable within the chamber (4); the piston (5) having a valve seat (7) and the valve piston having a valve seal (12) arranged for sealingly cooperating with the seat (7) which is disposed towards the inlet (15). A passageway (8) leads from the seat (7) to the outlet (9). The valve member (10) is biased by a spring (13) against the seat (7) to close the passageway (8), and has an extension (11) passing through the passageway (8) and the outlet (9). The construction of the valve is such as to permit duly authorized operators to refill the container while tending to prevent unauthorized operators from doing so.

13 Claims, 2 Drawing Sheets

CONTAINER VALUE

This invention relates to a fluid valve (hereinafter referred to as "a valve of the kind hereinbefore specified") for incorporation in, association with or attachment to a container for storing a fluid under pressure and arranged for charging a said container therethrough with, and dispensing therethrough from said container, a said fluid.

The invention also includes within its scope a said container comprising a said valve.

Fluids which may be stored in such containers will in general be compressible gases at relatively high pressures. The invention is particularly applicable to containers for carbon dioxide (which will at normal climatic temperatures exert a pressure usually in the range of 20 to 100 bar) but the invention may also be employed with other pressure-liquefiable gases and with so-called "permanent" gases such as oxygen, nitrogen, argon, neon, helium and the like, and with liquids.

A very wide variety of such containers (usually called "gas cylinders") are known and are in daily use. These gas cylinders conventionally carry an inlet/outlet valve assembly which—apart from sealing the cylinder contents against escape when closed—can perform only one service: that of allowing fluid to flow either in or out when the valve is open; no other function is performed by such conventional valves. Some minor exceptions to this rule include the small (405 ml capacity) carbon dioxide gas cylinder sold under the registered trade mark SODASTREAM and used in home drinks carbonators: the valve assembly carried by this cylinder communicates the internal pressure to a bursting disc so as to empty the cylinder if that pressure exceeds 200 bar approximately; the broadly-similar carbon dioxide ($CO_2$) cylinder sold under the registered trade mark MERRI-MIX also carries a valve assembly having a bursting disc—but in an unusual arrangement which allows the contents to be emptied axially through the valve assembly's normal outlet passage, rather than from a passage branching at right-angles to the valve assembly's axis as in the SODASTREAM cylinder.

A relatively recent advance in the art is described in UK patent application No. 8210083 which discloses lightweight and lower-cost fluid containers wherein, in addition to an inlet/outlet valve and one or more bursting devices of substantially conventional nature, there is provided a pressure-relief valve designed to shed a small proportion of the container's contents if their pressure exceeds a threshold level. By this means the wall-thickness, weight and cost of the container may be reduced.

However, all these cylinders suffer from a common disadvantage: they are very easy to refill and are therefore likely to fall into the hands of unauthorised or unskilled refilling operators, who might refill them with contaminated or sub-standard $CO_2$, or overfill them, fail to check the bursting disc or fail to provide an adequate refilling service in a variety of ways. This practice generates obvious risks to the health and safety of customers, the cleanliness and reliability of both the cylinders themselves and of the appliances they are used in, and compromises the reputation of the bona fide manufacturers of cylinders and appliances.

It is an object of the present invention to reduce or eliminate this aforesaid disadvantage and, by way of the improved valve embodying the present invention, to make it extremely difficult for an unauthorised operator to refill the container, whilst permitting an authorised operator to do so using equipment specially adapted to cooperate with the valve.

Throughout the description and claims the expressions "inlet" and "outlet" are used in the sense of inlet to the valve from the container and outlet from the valve for the purpose of dispensing or discharging the fluid to atmosphere or to apparatus utilising a pressurised fluid which had been stored in the container. It will be appreciated that consequently, in the context of charging the container, what is throughout referred to as the "outlet" will in fact be taking in fluid and vice versa.

According to the invention, in a first aspect thereof, a valve of the kind hereinbefore specified has a longitudinal axis about which there is disposed a chamber which has at one end thereof an inlet for a said fluid from a said container and at its other end an outlet for said fluid (as hereinbefore defined); a valve piston member sealingly guided and movable within the said chamber; and a valve member which is also movable within the said chamber; one said member having a valve seat element and the other said member having a valve seal element arranged for sealingly cooperating with said valve seat element; and a passageway leading from said last-mentioned element to said outlet, said valve member being biased against said last-mentioned element to close said passageway.

Preferably, the said element of said valve piston member is disposed towards said chamber inlet, and said valve member has an extension passing through said passageway and said outlet.

According to the invention, in a second aspect thereof, a container for storing a fluid under pressure has incorporated therein, or associated therewith, or attached or fitted thereto, a fluid valve according to the said first aspect of the invention.

The crux of the present invention lies in the provision of—in contrast to the usually-fixed valve seat—a movable valve piston carrying an integral valve seat and passageway which is normally closed by the valve member biased against it. The valve member has an extension passing through the passageway in the valve piston and reaching the outlet of the valve assembly, where it can be actuated in the normal manner to discharge the contents of the container. In this situation—with the container's internal pressure being higher than the pressure external to the container—this pressure difference will act on the movable valve piston so as to urge it towards the outlet and thus away from the valve member; consequently the passageway leading from the valve seat remains open and normal discharging is facilitated.

However, during filling of the container, the external fluid supply pressure must be higher than the internal pressure. This therefore creates a pressure difference in the reverse direction, which acts on the valve piston and moves it against the valve member, thus closing the passageway from the valve seat; consequently the flow of fluid into the container is impeded.

The question then arises of how the present invention permits an authorised operator to fill such a container legitimately. The answer to this question is that the present invention also provides (and this is a second part of the invention) means for the said valve piston to be restrained towards the said outlet so as to prevent or reverse any movement of the said valve piston towards the said inlet.

This second part of the present invention, which may be embodied in a variety of ways, then allows an authorised operator to prevent the valve piston from moving in the same direction as the flow of refilling fluid, or indeed to move the valve piston in a direction opposite to the flow of refilling fluid. This second feature thus allows (in one embodiment) the valve member to be moved away from the valve seat provided on the valve piston, thereby opening the passageway from the valve seat and permitting refilling flow from the outlet to the chamber inlet, or (in another embodiment) permits the valve piston to be moved towards the outlet so as to open a second passageway for the purpose of admitting a flow of fluid towards the chamber inlet. This second embodiment has the additional virtues that it permits the present invention to be adapted to perform another useful function of pressure-relief at a desired threshold pressure, and also that it can be adapted so that it is essential to employ this second passageway for refilling, as explained later herein; this latter feature can be adapted to make unauthorised refilling even more difficult.

The above-mentioned second feature (i.e. the means for the valve piston to be restrained) may in some embodiments comprise a tubular extension of the valve piston, extending coaxially with the extension to the valve member through the outlet; the said tubular extension is then accessible at the exterior of the chamber outlet and so can be gripped or engaged by an external device for the purpose of restraining the valve piston towards the outlet during refilling. In a third embodiment, the second feature may for example be a circumferential groove or a circlip mounted near the end of the extension to the valve member and which can be engaged by an external restraining device; this allows the valve member to be moved together with the valve piston in a direction towards the outlet so as to open a second passageway to admit flow towards the chamber inlet; this requires that the valve will be pressed against the valve seat on the valve piston, thereby closing the first passageway and making it essential to employ the second passageway for the purpose of refilling.

In embodiments which incorporate the second passageway it is preferable to provide piston biasing means to bias the valve piston towards the chamber inlet so as to seal the second passageway therefrom when the fluid pressure at the chamber inlet is below a threshold level. This piston biasing means firstly ensures that the second passageway is normally closed and that it is then necessary to move the valve piston towards the outlet in order to open the second passageway for the purpose of refilling and, secondly, provides a means of calibrating the piston biasing force with respect to the piston position at which the second passageway begins to open; this particular piston biasing force can thus be chosen to correspond to a certain threshold fluid pressure, above which the second passageway will start to open so as to relieve some of that pressure.

Whether or not the said second passageway is incorporated, the said piston biasing means may be adapted to perform another desirable function, namely, to bias the valve piston against the valve member (despite any friction) so as to keep the first passageway closed at the low internal pressures that normally precede refilling. To this end, the piston biasing means is advantageously adapted to have sufficient travel to keep the first passageway closed (when the valve piston is not restrained according to the invention), so preventing unauthorised refilling even at very low flow rates.

The second passageway employed in suchlike embodiments of the present invention may conveniently comprise one or more small bleed ports drilled, pierced, moulded or otherwise formed through the side wall of the valve's chamber at the appropriate longitudinal position. The valve piston should advantageously be provided with a cupped lip seal (rather than, say, a conventional toroidal "O" ring) in order to define more accurately the piston position at which any bleed port starts to open. The material of this seal should preferably be of an abrasion-resistant elastomer such as polyurethane rubber. To minimise abrasion or other damage to the seal, it is important that no burrs or sharp corners should be present where any bleed port debouches into the chamber and that the diameter of any bleed port should be small: for instance less than 0.5 millimeter in embodiments of the size depicted herein; such a small size has the added advantage of limiting the flow rate (and noise production) of escaping fluid, during pressure relief, to an acceptable level; a plurality of suchlike small bleed ports may be provided in order to increase fluid flow during refilling. An alternative for the second passageway is to form one or more longitudinal channels or grooves in the inner surface of the chamber wall, terminating them at an appropriate longitudinal position so that, again, they begin to become uncovered when the valve piston is in the longitudinal position corresponding to the desired threshold pressure.

The piston biasing means in suchlike embodiments may comprise a conventional helical compression spring or, more advantageously, one or more resilient dished washers which are sometimes called "disc springs" or "Belleville washers". Apart from the benefit of their compactness, such disc springs should preferably be chosen so that they exhibit a very non-linear or "regressive" force-deflection characteristic such that the piston biasing force will increase very much less sharply—or even be reduced—as the valve piston approaches the point of opening the second passageway, in order to confer two further advantages: firstly the probability and frequency with which the seal on the valve piston nears the (possibly damaging) edge of the second passageway will be reduced; secondly, once the second passageway has been opened so as to relieve over-pressure, such regressive disc-springs will not return the valve piston to close the second passageway until the fluid pressure has fallen by a significant amount, which reduces the probability and frequency of opening of the second passageway; this second advantage can also be achieved or augmented by introducing a degree of friction or hysteresis into the motion of the valve piston and piston biasing means, for example by choosing the disc springs to have a highly regressive characteristic (which imparts hysteresis) or by stacking a plurality of disc springs "in parallel" i.e. so that the convex side of one disc spring fits into the concave side of its neighbouring disc spring (which imparts friction between the mating surfaces of the disc springs). These two advantages reduce wear and increase the life of the seal on the valve piston.

The valve member of the present invention may be biased against the valve seat of the valve piston by any suitable means, of which the fluid pressure itself or conventional helical compression springs are examples that are often quite adequate; other or less conventional springs or means for producing a biasing force may be used with similar effect. The valve seat (and/or the cooperating surface of the valve member) should advantageously be of an abrasion-resistant material such as polyurethane rubber.

Three forms of valve embodying the present invention will now be described, by way of example only, with reference to the accompanying drawings, in which.

Figure 1:
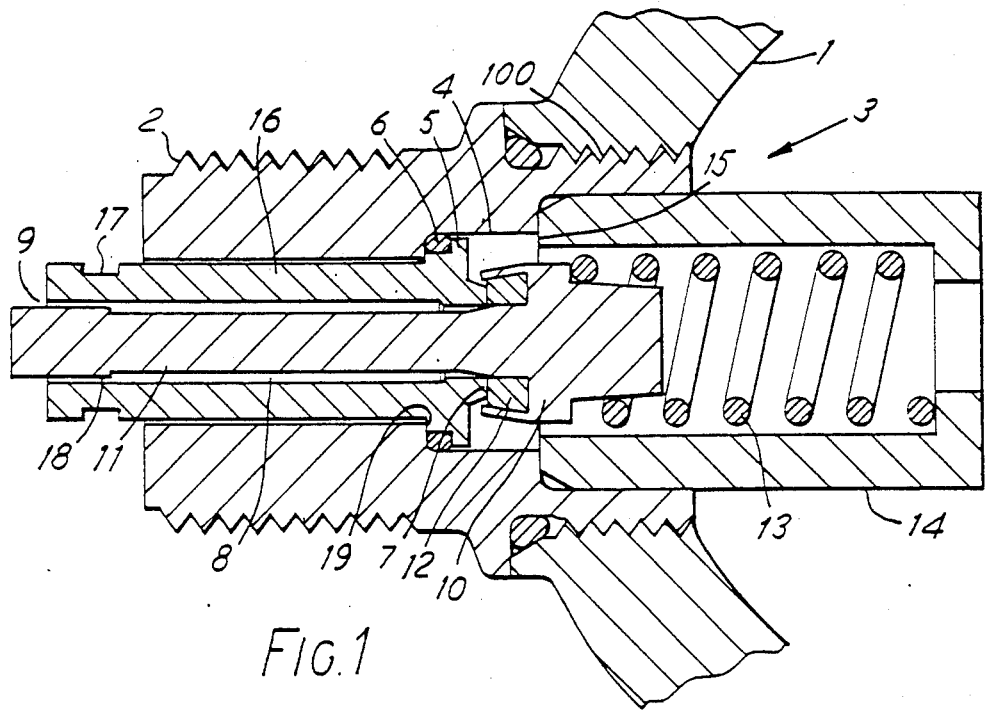
FIG. 1 shows, in longitudinal section, a first said form of valve and part of a container in which it is incorporated.

Referring to FIG. 1, the valve 3 is incorporated by screw threads 100 in a container 1 for storing a fluid under pressure; the valve has, disposed about a longitudinal axis, a chamber 4 which has at one end thereof an inlet 15 for a said fluid from the container 1 and at its other end an outlet 9 for said fluid. A valve piston member 5 (hereinafter referred to as a piston) is sealingly guided and movable within the chamber 4, the latter being cylindrical and of circular cross-section. A valve member 10 is also movable within the chamber 4. The piston 5 has a valve seat element (hereinafter referred to as a valve seat) 7 and the valve member has a valve seal element (hereinafter referred to as a valve seal) 12 arranged for sealingly cooperating with the valve seat 7. The valve seat 7 is disposed towards the chamber inlet 15. A passageway 8 leads from the valve seat 7 to the outlet 9. The valve member 10 is biased against the valve seat 7 to close the passageway 8. An extension 11 of the valve member 10 passes through the passageway 8 and through the outlet 9.

The valve piston 5 has a piston seal 6 for sealing the piston 5 against the wall of the chamber 4; the seal 6 is constituted by an O-ring preferably made of an abrasion-resistant elastomer such as polyurethane. A shoulder 19 is provided on the valve piston 5 so as to act as both a stop and a further seal, providing leak-tightness that may be enhanced by suitable choice of material e.g. by making the shoulder 19 of an elastomer such as polyurethane. The valve seal 12 is also made of polyurethane or similar abrasion-resistant elastomer.

The valve member 10 is biased against the valve seat 7 by means of a valve return spring 13 housed within a valve plug 14 which is press-fitted into the chamber inlet 15.

The valve piston 5 is provided with a tubular extension 16 having a circumferential groove 17; these two features together provide means for the valve piston 5 to be restrained for the purpose of (authorised) refilling of the container 1, as will hereinafter be described.

The above-described valve assembly 3 allows fluid to be dispensed from the container 1 in the normal manner: thus, when the pressure at the chamber inlet 15 is in this case greater than the pressure at the outlet 9, the valve piston 5 will stay in the leftward (as in FIG. 1) position shown in FIG. 1, and the valve member 10 can be moved rightward (as in FIG. 1) so as to lift the valve seal 12 away from the valve seat 7 by pressing the tip of the extension 11 in the usual way; this allows fluid to flow from the chamber inlet 15 through the passageway 8 to the outlet 9 so as to facilitate dispensing of fluid.

In contrast, if an attempt is made to refill the container 1 in the conventional manner, i.e. by merely applying a source of refilling fluid at the outlet 9 having a pressure greater than the at the chamber inlet 15 whilst depressing the extension 11 to the valve member 10 in a rightward direction (as in FIG. 1), then the valve piston 5 will (under the effect of the said greater pressure) follow the movement of the valve member 10 so as to keep the valve seat 7 pressed against the valve seal 12, thus preventing fluid from flowing through the passageway 8 to refill the container 1. Unauthorised refilling of the container 1 is thereby prevented. Even if the extension 11 is pressed rightwards (as in FIG. 1) before applying the refilling fluid at the outlet 9—which might appear to equalise the pressures on each face of the valve piston 5 and so permit unauthorised filling—then, as soon as a flow of refilling fluid is initiated through the passageway 8, a dynamic pressure drop will be generated from the leftward to the rightward (as in FIG. 1) extremities of the passageway 8 and this pressure drop will move the valve piston rightward (as in FIG. 1) in the intended manner; to accentuate this desired dynamic pressure drop it may be desirable to provide a narrow orifice or constriction 18 in the passageway 8.

However, the present invention does allow a duly-authorised operator to refill the container 1 as follows: the refilling equipment (not shown in FIG. 1) is provided with restraining means such as a known collet, clamp ring, grip or suchlike device which engages with the groove 17 in the tubular extension 16 and which prevents rightward (as in FIG. 1) movement of the valve piston 5 during the refilling process. The extension 11 of the valve member 10 can then be depressed in the normal manner so as to lift the valve seal 12 away from the valve seat 7 and to allow refilling fluid to flow through the passageway 8 and into the container 1.

Figure 2:
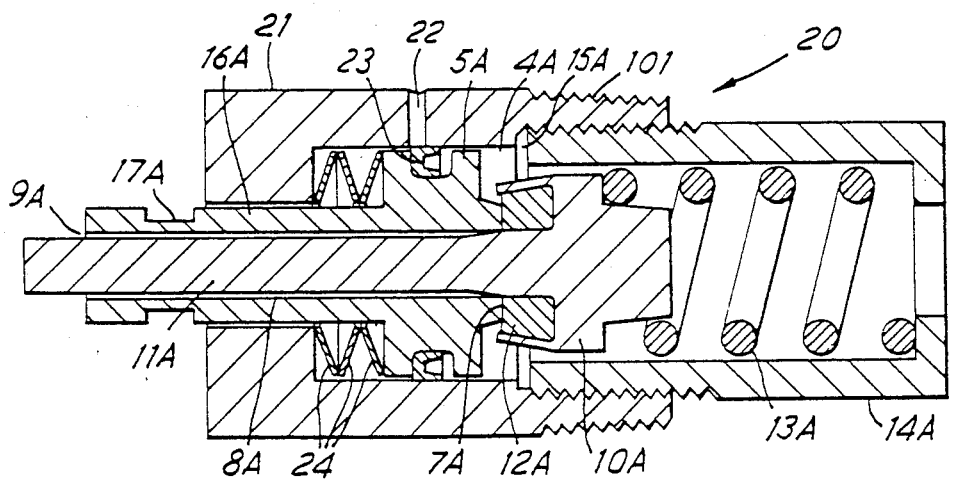
FIG. 2 shows, in longitudinal section, a second said form of valve, viz. one incorporating a second passageway and valve piston biasing means.

Referring to the second embodiment shown in FIG. 2, this shows a self-contained valve assembly 20 according to the present invention, assembled to a valve body 21 so as to constitute a self-contained unit which could be incorporated in or with any suitable container, for example, by means of the tapered screw thread 101. A chamber 4A, valve piston 5A, valve seat 7A, passageway 8A, outlet 9A, valve member 10A with its extension 11A, valve seal 12A, valve return spring 13A, valve plug 14A, chamber inlet 15A, tubular extension 16A and circumferential groove 17A are provided, being functionally equivalent to those parts in FIG. 1 which have the same reference numerals but no suffix A.

In addition, the FIG. 2 embodiment incorporates a second passageway according to the present invention and constituted by the bleed port 22 which is in this example 0.4 mm in diameter and formed without sharp edges or burrs where it debouches into the chamber 4A; this minimizes the risk of damage to the piston seal which in this embodiment comprises a cupped lip seal 23 made from polyurethane elastomer and which is depicted in FIG. 2 in the approximate position it would take up when the fluid pressure at the chamber inlet 15A were at a normal level.

Also illustrated in this second embodiment, the valve piston 5A is provided with piston biasing means constituted by three disc springs 24 stacked in series and chosen (with a high degree of concavity) so as to have a non-linear and regressive force-deflection characteristic which reaches a "plateau" when the valve piston 5A moves leftward (as in FIG. 2) under increasing fluid pressure until the cupped lip seal 23 begins to uncover the bleed port 22 at a desired threshold fluid pressure. This non-linear and regressive characteristic further minimizes wear and damage to the cupped lip seal 23 as explained earlier herein.

From study of FIG. 2, which illustrates a valve assembly designed to relieve at pressures exceeding a threshold level of 20 bar, it will be apparent that the disc springs 24 can be chosen, together with the diameter of the bore of the chamber 4A and the relative position of the bleed port 22 and the cupped lip seal 23, so as to provide a means of calibrating the piston biasing force with respect to the axial position of the valve piston 5A at which the bleed port 22 begins to open. Thus, as the fluid pressure at the chamber inlet 15A rises, the valve piston 5A will progressively move to the left (as in FIG. 2) until, at the designed threshold fluid pressure level, the bleed port 22 will begin to open—or be completely uncovered if the disc springs 24 are chosen to have a sufficiently regressive characteristic—and allow some of that fluid to escape through the bleed port 22, thereby lowering the fluid pressure. This feature of the FIG. 2 embodiment allows (for example if the valve assembly 20 is incorporated in a container whose internal pressure desirably should not exceed a certain threshold level which, in this example, is 20 bar) the valve assembly 20 to serve the additional and useful function of a pressure-relief valve; naturally in such a case the bleed port 22 would be positioned relative to the said container so as to allow such escaping fluid to be vented safely.

The bleed port 22 and the disc springs 24 in this second embodiment provide a further advantage according to the invention, namely that the bleed port 22 can be used for refilling any container in which the valve assembly 20 is incorporated: thus, by displacing the valve piston 5A to the left (as in FIG. 2), for example by engaging an external collet, grip, clamp ring or suchlike device (not shown, being part of the refilling apparatus) with the groove 17A in the tubular extension 16A and moving it to the left (as in FIG. 2), the bleed port 22 will be no longer covered by the cupped lip seal 23 and will communicate with the chamber 4A and with the interior of any container in which the valve assembly 20 is fixed; refilling of such a container can then be accomplished by introducing the refilling fluid via the bleed port 22. During such an operation the valve assembly would normally remain closed because the valve member 10A would follow the movement of the valve piston 5A, being biased by the valve return spring 13A. It will be apparent that the bleed port 22 can be concealed or disguised so as to make it even more difficult for an unauthorised operator to refill any container incorporating this embodiment.

Figure 3:
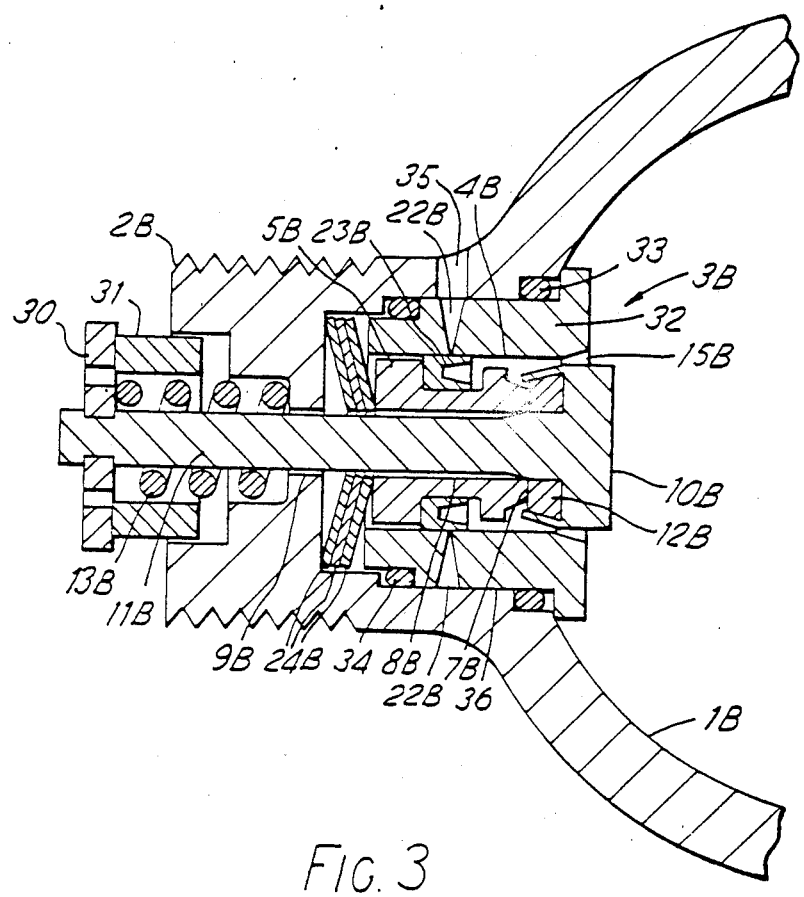
FIG. 3 shows, in longitudinal section, a third said form of valve, viz. one incorporating alternative means for the valve piston to be restrained and alternative means to bias the valve member against the valve seat of the valve piston.

A third embodiment of the present invention is illustrated in FIG. 3, which depicts part of a carbon dioxide container 1B incorporating a valve assembly 3B according to the invention and having a threaded outlet end 2B for attachment to an appliance (not shown) requiring a supply of carbon dioxide. A chamber 4B, valve piston 5B, valve seat 7B, passageway 8B, outlet 9B, valve member 10B with its extension 11B, valve return spring 13B (mounted as shown so as to avoid the need for a valve plug as in the FIG. 1 and FIG. 2 embodiments) and chamber inlet 15B are provided, being functionally equivalent to those parts in FIGS. 1 and 2 which have the same reference numerals but no suffix B. However, FIG. 3 illustrates several variations of the present invention which will now be described.

Firstly, the chamber 4B is provided with a chamber liner 32 which is press-fitted into the container 1B and sealed by the O-rings 33 and 34. Advantageously the chamber liner 32 is of injection-moulded plastics material so that the bore of the chamber 4B will have a very smooth surface finish (in order that the cupped lip seal 23B will allow very little leakage and suffer less wear) and so that a plurality of bleed ports 22B tapering down to a diameter of only 0.2 mm may be moulded therein; this again reduces wear and damage to the cupped lip seal 23B and lowers the noise-level experienced during pressure-relief. All such bleed ports 22B communicate with the single vent-and-fill hole 35 which, as shown, can now be of a substantially larger diameter, for ease of production and to increase the speed of fluid flow during refilling; the bleed ports 22B all communicate with the vent-and-fill hole 35 by means of a narrow annular clearance gap 36 between the chamber liner 32 and that part of the container 1B in which it fits.

Secondly, provision of the chamber liner 32 allows the outside diameter of the three disc springs 24B to be significantly larger than the diameters of the valve piston 5B and of the cupped lip seal 23B which are thereby reduced substantially to little more than the diameter of the valve member 10B as illustrated in FIG. 3. This not only reduces leakage but also reduces the gas pressure loading on the valve piston 5B during service and refilling, which confers an important benefit in the case of usage with high-pressure fluids such as carbon dioxide for which the threshold of pressure relief may for instance be in the region of 100 bar or more because it allows the number of disc springs 24B to be limited to one, two or at most three (as illustrated) in parallel; without it, five or more disc springs 24B in parallel might be needed to resist the fluid pressure force on the valve piston 5B. In the FIG. 3 embodiment, three disc springs 24B of a highly-regressive characteristic are employed in parallel so that friction between their mating surfaces will increase their hysteresis and so increase the life of the cupped lip seal 23B as explained earlier herein.

Thirdly, FIG. 3 illustrates that—instead of employing a tubular extension to the valve piston (as in FIGS. 1 and 2) as the means for the valve piston to be restrained to allow the valve to open and permit filling of the container—this third form of valve embodying the invention employs the extension 11B to the valve member 10B as the means to permit refilling of the container by authorised persons.

Thus, the said extension 11B is provided with a circlip 30 which retains not only the valve return spring 13B but also a collar 31; it can be seen from the outline in elevation of the circlip 30 and the collar 31 that they—as opposed to the circumferential groove 17 and 17A in FIG. 1 and FIG. 2 respectively—provide the means for the valve piston 5B to be restrained though, in this embodiment, by displacing the valve member 10B to the left (as in FIG. 3) and so displacing the valve piston 5B simultaneously.

This variation provides another advantage in that, as the valve piston 5B is displaced to the left (as in FIG. 3) so that the cupped lip seal 23B uncovers a plurality of second passageways provided by the bleed ports 22B, the valve seal 12B necessarily remains pressed against the valve seat 7B, keeping the first passageway 8B and outlet 9B closed; therefore it is impossible to fill the container 1B via the outlet 9B (as would be the natural and conventional manner) and this variation of the present invention therefore provides still further impediment to refilling by unauthorised operators. It will be clear to those skilled in the art that the means for the valve piston member to be restrained may comprise one or more of a wide variety of alternatives, for example, mechanical, pneumatic, hydraulic, inertial, magnetic, electrical or electrostatic means.

From the foregoing it will be appreciated that the valve as hereinbefore described and embodying the present invention provides, by its inherent nature, the ability to perform the function of pressure-relief at a desired threshold level, thereby giving further advantages of cost-reduction, greater reliability and compactness; this allows the savings of wall-thickness, weight and cost of the container to be achieved also in containers of smaller size than those employing the invention described and claimed in the said UK patent application No. 8210083 which is most applicable to containers over 50 mm in diameter and over 200 ml in capacity. In contrast, the present invention can be applied in containers of diameters down to 20 mm or less having capacities of as little as 10 ml.

I claim:

1. A fluid valve characterized by having a longitudinal axis about which there is disposed a chamber which has at one end thereof an inlet for a fluid from a container and at its other end an outlet for said fluid; a valve piston member sealingly guided and movable within said chamber; and a valve member which is also movable within said chamber; one of said members having a valve seat element and the other of said members having a valve seal element arranged for sealingly cooperating with said valve seat element; and a passageway leading from said last-mentioned element to said outlet, said valve member being biased against said last-mentioned element to close said passageway.

2. A valve according to claim 1 characterised in that said element of said valve piston member is disposed towards said chamber inlet.

3. A valve according to claim 1 characterised in that said valve member has an extension passing through said passageway and said outlet.

4. A valve according to claim 1 characterised by including means for restraining said valve piston member towards said outlet so as to prevent movement of said valve piston member towards said chamber inlet.

5. A valve according to claim 4 characterised by including piston member biasing means to bias said valve piston member towards said chamber inlet.

6. A valve according to claim 1 characterised by including a second passageway, the latter leading from an opening in and to the exterior of the said chamber and including piston member biasing means to bias said valve piston member towards said chamber inlet.

7. A valve according to claim 6 characterised in that said piston biasing means allows said valve piston member to uncover said second passageway at a threshold pressure level of said fluid in order to put said chamber inlet into communication with the exterior of said chamber.

8. A valve according to claim 6 characterised in that said second passageway is arranged to convey a reverse flow of fluid from said chamber exterior to said chamber inlet.

9. A valve according to claim 5 characterised in that said piston biasing means have a regressive characteristic.

10. A valve according to claim 5 characterised in that said piston biasing means are in the form of a plurality of stacked disc springs which are so arranged that the convex side of one disc spring fits into the concave side of its neighboring disc spring, thereby imparting friction between the mating surfaces of the disc springs.

11. A container for storing a fluid under pressure characterized by having associated therewith a valve having a longitudinal axis about which there is disposed a chamber which has at one end thereof an inlet for said fluid from said container and at its other end an outlet for said fluid; a valve piston member sealingly guided and movable within said chamber; and a valve member which is also movable within said chamber; one of said members having a valve seat element and the other of said members having a valve seal element arranged for sealingly cooperating with said valve seat element; and a passageway leading from said last-mentioned element to said outlet, said valve member being biased against said last-mentioned element to close said passageway, said valve being arranged for charging the container through said valve with said fluid and dispensing said fluid through said valve from said container.

12. A container for storing a fluid under pressure characterized by having associated therewith a valve having a longitudinal axis about which there is disposed a chamber which has at one end thereof an inlet for said fluid from said container and at its other end an outlet for said fluid; a valve piston member sealingly guided and movable within said chamber; and a valve member which is also movable within said chamber; one of said members having a valve seat element and the other of said members having a valve seal element arranged for sealingly cooperating with said valve seat element; and a passageway leading from said last-mentioned element to said outlet, said valve member being biased against said last-mentioned element to close said passageway, said valve being arranged for charging the container through said valve with said fluid and dispensing said fluid through said valve from said container, said valve including means adapted for cooperation with a special tool, mechanism or other means for overcoming said biasing to refill said container, whereby the refilling of said container by unauthorised operators can be prevented.

13. A valve for controlling the dispensing of a fluid such as carbon dioxide gas from a container, said valve comprising a chamber defined by an elongate bore in a body, inlet means at one end of the body and outlet means at the other end of the body,
- a valve piston sealingly guided by the bore and having a hollow stem which extends therefrom to protrude through the outlet means,
- a valve member having a sealing surface to close the hollow stem of the valve piston and having an actuating rod which extends from the sealing surface through the hollow stem to protrude beyond the end of the hollow stem outwardly of the outlet means,
- first resilient means to urge the valve member towards the valve piston, and
- second resilient means to urge the valve piston towards the valve member,
- the second resilient means being compressible by relative motion between the hollow stem of the valve piston and the actuating rod of the valve member to hold the valve open,
- whereby a container can be filled through the valve.

* * * * *